May 21, 1963 — D. H. BAUMHART — 3,090,877
DYNAMOELECTRIC MACHINE
Filed Dec. 29, 1958 — 2 Sheets-Sheet 1

D. H. BAUMHART
INVENTOR.

BY E. C. McRae
D. H. Oster
K. L. Zerschling
ATTORNEYS

May 21, 1963 D. H. BAUMHART 3,090,877
DYNAMOELECTRIC MACHINE
Filed Dec. 29, 1958 2 Sheets-Sheet 2

D. H. BAUMHART
INVENTOR.

BY E. C. McRae
J. H. Oster
H. L. Zerschling
ATTORNEYS

United States Patent Office 3,090,877
Patented May 21, 1963

3,090,877
DYNAMOELECTRIC MACHINE
Donald H. Baumhart, Livonia, Mich., assignor to Ford Motor Company, Dearborn, Mich., a corporation of Delaware
Filed Dec. 29, 1958, Ser. No. 783,353
4 Claims. (Cl. 310—154)

This invention relates to a dynamoelectric machine and more particularly to such a machine having a permanent magnet stator structure.

According to the construction of the invention there is provided a dynamoelectric machine, for example, a two-speed fractional horsepower motor, having a stator structure which employs a pair of permanent magnets as the field of the machine. These magnets are preferably mounted and held in a split shell by means of a pair of spring clips which are affixed to the shell and which have flexible end portions engaging the magnets. The shell is placed into the housing of the machine in a press fit relationship. Since the shell is split, the circumferential dimension may be varied as it is forced into the housing to take up any errors which may occur during the manufacture of the housing, the magnets and the shell. This permits the machine to be constructed with a minimum of precision, thereby reducing the cost of manufacture.

An object of the invention is the provision of a dynamoelectric machine having a permanent magnet stator structure.

Another object of the invention is the provision of a permanent magnet stator structure for a dynamoelectric machine.

A further object of the invention is the provision of a permanent magnet structure for a dynamoelectric machine in which manufacturing tolerances may be relaxed, thereby reducing the cost of manufacture.

Other objects and attendant advantages will become more apparent when considered in connection with the accompanying drawings wherein.

Figure 1:
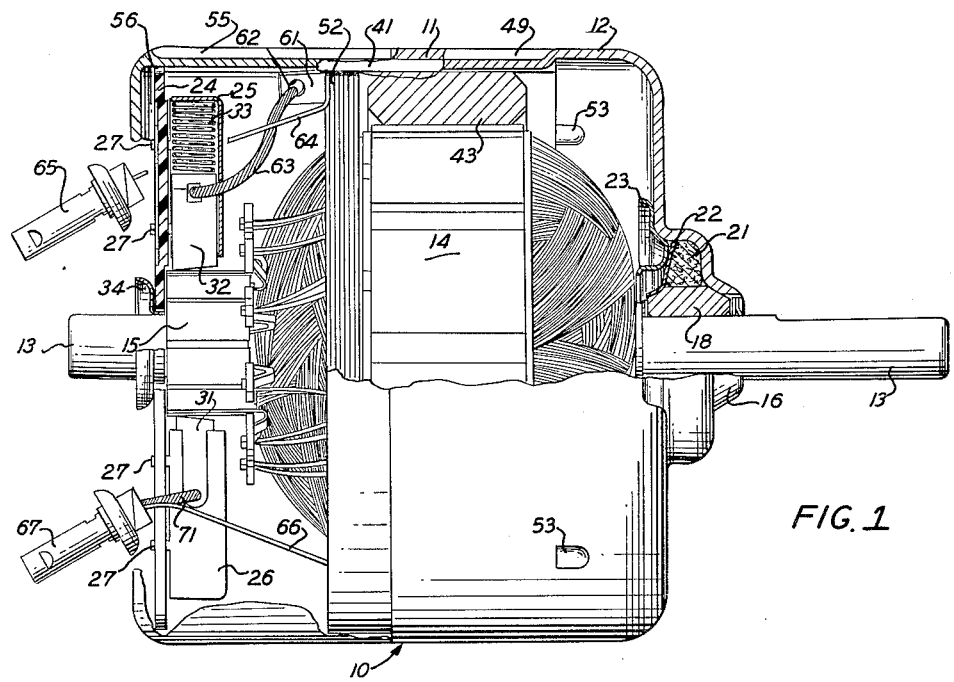
FIGURE 1 is a partial longitudinal sectional view of the dynamoelectric machine of the present invention showing portions thereof in elevation.
Figure 2:
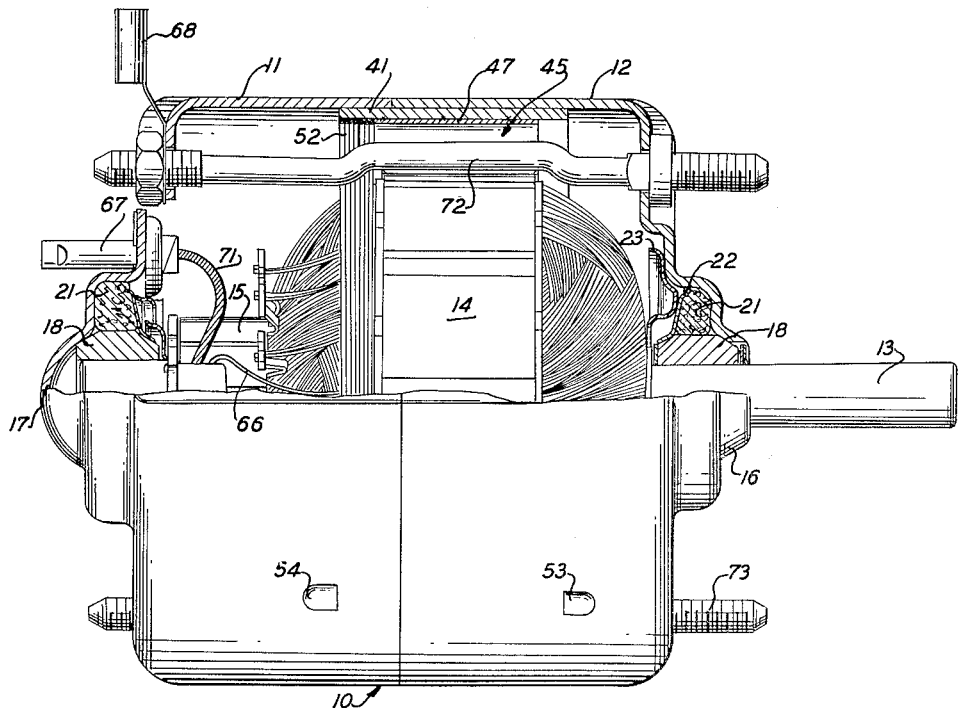
FIGURE 2 is a partial longitudinal sectional view showing portions in elevation and taken at approximately 90 degrees to the view of FIGURE 1.

Referring now to the drawings in which like reference numerals designate like parts throughout the several views thereof, there is shown in FIGURES 1 and 2 a dynamoelectric machine which may be a two-speed fractional horsepower commutator type electric motor, generally designated by the numeral 10, having a pair of cup housings 11 and 12 which together with a split shell to be described in detail later comprise the frame of the machine. A conventional rotor assemby comprising a shaft, 13, an armature 14 and a commutator 15 is rotatably mounted within the cup housings 11 and 12 by means of a pair of bearings which are positioned in recessed end portions 16 and 17 of the cup housings. Each of these bearings may comprise a sleeve 18 of porous material which rotatably supports the shaft 13. A lubricant impregnated packing 21 surrounds the sleeve 18 so that lubricant will seep through the sleeve to lubricate the shaft. Each of the sleeves may be retained within the recess in the cup housings by suitable means, for example, an annular spring 22 which engages the sleeve and a spring retainer 23. The spring retainer 23 is secured to the cup housing by any suitable means, for example, by spot welding.

A sheet of rigid insulating material 24 having receptacles 25 and 26 attached thereto by means of tabs 27 is mounted on shaft 13 against the edge of commutator 15. A pair of electrical contact brushes 31 and 32 are positioned within the receptacles 25 and 26 and are urged against the commutator 15 by springs, one of which is shown at 33. The sheet of rigid insulating material 24 is held against the edge of the commutator 15 with a few thousandths of an inch clearance by means of an oil shield 34 which is press fitted on the shaft.

Figure 4:
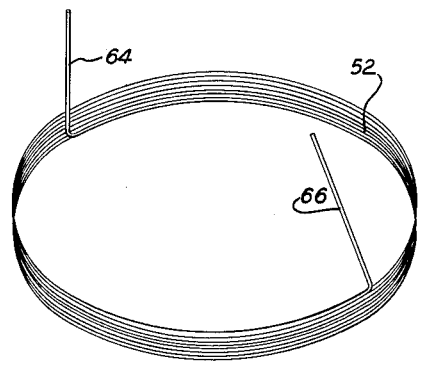
FIGURE 4 is a perspective view of a resistor shown on a reduced scale from FIGURES 1, 2 and 5 and used in the circuit of the dynamoelectric machine; and, FIGURE 5 is a cross-sectional view taken along the lines 5—5 of FIGURE 3.
Figure 3:
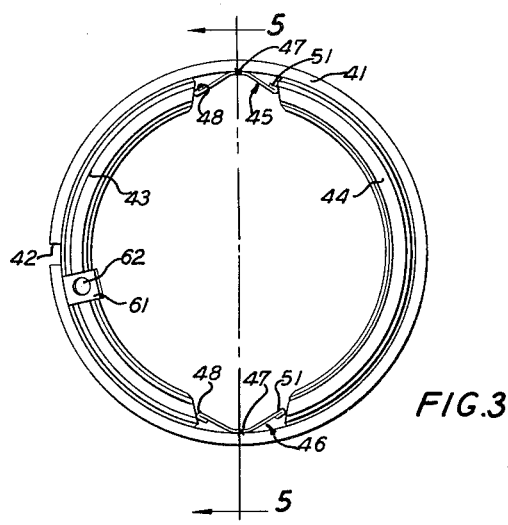
FIGURE 3 is an end elevational view of the field structure of the present invention on a reduced scale from that of FIGURES 1, 2 and 5.
Figure 5:
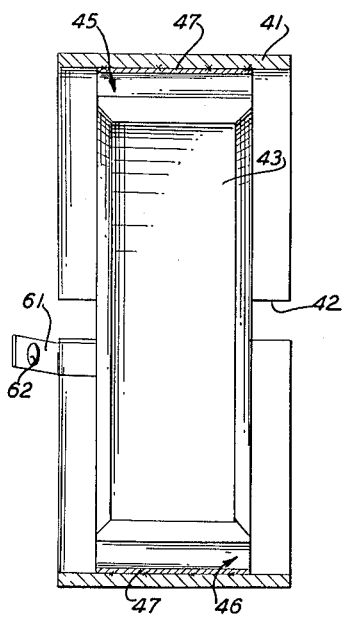

Referring now to FIGURES 3 thru 5, there is shown a split shell 41, preferably of cylindrical configuration, having a slot 42 extending completely through the wall thereof. A pair of permanent magnets 43 and 44, preferably composed of barium ferrite and having the chemical formula $BaO \cdot 6Fe_2O_3$, are mounted within the split shell 41 by means of a pair of spring clips 45 and 46. Each of these clips has a central portion 47 which conforms to the configuration of the shell 41 and is affixed thereto by any suitable means, for example, spot welding. Each clip also has flexible end portions 48 and 51 which engage the ends of the permanent magnets 43 and 44 and force these magnets against the inner wall of the shell 41.

A resistor 52 of cylindrical configuration is shown in FIGURE 4 which is adapted to be switched into the armature circuit of the machine to change the speed thereof. This resistor has an outside diameter equal to the inside diameter of the shell 41 and, as shown in FIGURES 1 and 2, is positioned in the shell and against the inner wall thereof.

The assembly shown in FIGURE 3, having the resistor 52 mounted in the front portion thereof is inserted in the cup housing 12 for a portion of the length of the shell 41. The cup housing 12 has a radially inwardly extending protrusion 49 which is positioned in the slot 42 in the split shell 41. The axial position of the shell 41 and the magnets 43 and 44 is limited by a plurality of radially inwardly extending protrusions 53 located in the cup housing 12 which engage the end of the shell. It will be noted by reference to FIGURES 1, 2 and 5 that the outer diameter of the split shell 41 is substantially equal to the inner diameter of the cup housings 11 and 12. Since the shell is split and the spring clips 45 and 46 are employed to mount the magnets 43 and 44, the circumferential dimension of the cylindrical shell 41 may be varied over considerable limits to provide a tight fit in the cup housings 11 and 12. Such a variation in circumferential dimension also permits the cup housings and the split shell to be manufactured with a minimum of precision.

The cup housing 11 also has a plurality of radially inwardly extending protrusions, one of which is shown at 54, which engage the end of the split shell 41 nearest the commutator 15. The slot 42 in the split shell 41 also receives an inwardly extending protrusion 55 in the cup housing 11 which extends for substantially the entire length of the housing. The inwardly extending protrusion 55 also engages a slot 56 in the end of the sheet of insulating material 24 for positioning this sheet in a proper circumferential position with respect to the commutator 15.

A tab 61 extends from the shell 41 and has a central aperture 62 for receiving a brush lead 63 which extends from the brush 32. Since the split shell 41 is in contact with the cup housings 11 and 12, this connection serves to effectively ground the brush 32 to the frame of the machine. The resistor 52 has a lead 64 extending therefrom which is connected to a plug-in type terminal 65 which in turn is adapted to extend through the front of the cup housing 11. Another lead 66 from the resistor 52 is connected to another plug-in type terminal 67 which extends through the front of the cup housing 11, as shown in FIGURE 2. A lead 71 from the brush 31 is also connected to the terminal 67.

A pair of through bolts 72 and 73 are provided for holding the cup housing 11 and the cup housing 12 in abutting relationship. These through bolts extend between the magnets 43 and 44 and are positioned radially inwardly from the central portion 47 of spring clips 45 and 46.

The permanent magnets 43 and 44 are magnetized in a radial direction with the north pole of one of the magnets, for example, magnet 43, being positioned on the inner face thereof adjacent the armature 14 with the south pole being positioned against the split shell 41. The other magnet, for example, magnet 44, is magnetized in the opposite direction so that the south pole is located along the inner face thereof adjacent the armature 14 with the north pole being positioned against the split shell 41. Thus the lines of magnetic flux between the north pole of the magnet 43 and the south pole of the magnet 44 pass directly through the armature 14. The split shell 41 is preferably constructed of a material having a low reluctance, and it provides a return path for the flux between the south pole of the magnet 43 which is positioned against the shell 41 and the north pole of the magnet 44 which is also positioned adjacent the shell 41.

Although the applicant prefers to mount the permanent magnets 43 and 44 within the split shell 41 for the reasons given above, these magnets may be mounted directly within the cup housings 11 and 12 with the central portion 47 of the spring clips 45 and 46 being affixed to one of the housings. In such a case the protrusions 53 and 54 in the cup housings would be in direct contact with the magnets and serve to locate these magnets axially with respect to the housings and the armature 14. The return flux path for the magnets would then be through the housings and care must be taken to provide sufficient material so that the portions of the housings located between the magnets do not become saturated. The lead 63 from the brush 32 in this instance would be connected directly to one of the cup housings, for example, housing 11.

When the dynamoelectric machine of the present invention is connected into a circuit, the terminals 65 and 67 are connected to a switch so that the resistor 52 may be inserted in the circuit to reduce the speed of the machine. When high speed operation is desired, current is fed to the machine through the terminal 67. This current flows through the brush 31 to the commutator 15, through the windings of the armature 14 back to the commutator 15, and then to ground through the brush 32, lead 63 and tab 61 of the split shell 41. To reduce the speed of the machine, current is fed to the terminal 65 rather than to the terminal 67. In this instance current flows from the terminal 65 through the resistor 52 via lead 64 to the brush 31 via lead 66 and brush lead 71 which are connected to terminal 67 and then through the armature to ground as previously described. This effectively inserts the resistor 52 in series with the armature 14 and thereby reduces the speed of said machine. A terminal clip 68 is positioned over the through bolt 72 and between the cup housing 11 and the nut of the through bolt so that the housing of the machine may be connected to an external ground.

The present invention thus provides a dynamoelectric machine having an inexpensive permanent magnet stator structure which is designed to accommodate manufacturing errors and tolerances.

It is to be understood that this invention is not to be limited to the exact construction shown but that various changes and modifications may be made without departing from the spirit and scope of the invention, as defined in the appended claims.

What is claimed is:
1. A dynamoelectric machine comprising a housing, a cylindrical split shell having an axial slot located to allow the shell to be compressed, a pair of permanent magnets, means engaging said split shell and said permanent magnets for holding said magnets within said split shell whereby said shell may be compressed, said split shell being positioned within and in engagement with said housing.

2. A dynamoelectric machine comprising a housing, a split shell having a slot located to allow the shell to be compressed circumferentially, a pair of permanent magnets, each of said magnets having an outer contour shaped to conform to the inner wall of said split shell, spring means affixed to said split shell and engaging said permanent magnets for holding said magnets within said split shell, said split shell being positioned within said housing with the outer wall thereof being in contact with the inner wall of said housing so that said shell is compressed circumferentially by said housing.

3. A dynamoelectric machine comprising a first cup housing, a split cylindrical shell, a pair of permanent magnets, means engaging said split cylindrical shell and said permanent magnets for holding said magnets within said split shell, said split cylindrical shell having a slot in the wall thereof running in the axial direction of said cylindrical shell, said split cylindrical shell having an outer diameter substantially equal to the inner diameter of said cup housing, said cylindrical shell fitting into said cup housing, stop means on said cup housing for positioning said cylindrical shell axially in said housing, a second cup housing having a radially inwardly extending protrusion running axially of said cup, a portion of said protrusion positioned in said slot in said split cylindrical shell.

4. A dynamoelectric machine comprising a housing, a split shell having an internal, an external surface and a slot located to allow the circumferential dimension of said shell to be varied, a pair of permanent magnets on said internal surface, resilient means on said internal surface of said split shell engaging the ends of said magnets, said split shell being positioned within said housing and having said external surface engaging said housing, whereby the external surface of said split shell conforms to the internal surface of said housing.

References Cited in the file of this patent

UNITED STATES PATENTS

| | | |
|---|---|---|
| 1,393,395 | Pletscher | Oct. 11, 1921 |
| 1,938,262 | Strickland | Dec. 5, 1933 |
| 1,944,590 | Beeh | Jan. 23, 1934 |
| 2,045,729 | Ruppe | June 30, 1936 |
| 2,456,701 | Hansen | Dec. 21, 1948 |
| 2,513,226 | Wylie | June 27, 1950 |
| 2,513,227 | Wylie | June 27, 1950 |

FOREIGN PATENTS

| | | |
|---|---|---|
| 180,771 | Great Britain | June 7, 1922 |
| 229,947 | Switzerland | Mar. 1, 1944 |
| 1,038,171 | Germany | Sept. 4, 1958 |